(12) United States Patent
Sakata (10) Patent No.: US 9,174,644 B2
(45) Date of Patent: Nov. 3, 2015

(54) VEHICLE SHIFT CONTROL DEVICE

(71) Applicant: Daimler AG, Stuttgart (DE)

(72) Inventor: Kunio Sakata, Kawasaki (JP)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/389,919

(22) PCT Filed: Mar. 28, 2013

(86) PCT No.: PCT/JP2013/059338
§ 371 (c)(1),
(2) Date: Oct. 1, 2014

(87) PCT Pub. No.: WO2013/150965
PCT Pub. Date: Oct. 10, 2013

(65) Prior Publication Data
US 2015/0072831 A1     Mar. 12, 2015

(30) Foreign Application Priority Data

Apr. 2, 2012   (JP) ................. 2012-084051

(51) Int. Cl.
*B60W 30/18* (2012.01)
*B60K 6/48* (2007.10)
(Continued)

(52) U.S. Cl.
CPC ............ *B60W 30/18009* (2013.01); *B60K 6/48* (2013.01); *B60K 6/547* (2013.01); *B60W 10/02* (2013.01); *B60W 10/08* (2013.01); *B60W 10/10* (2013.01); *B60W 10/113* (2013.01); *B60W 20/10* (2013.01); *B60W 30/18027* (2013.01); *B60W 30/18118* (2013.01); *F16H 59/66* (2013.01);
(Continued)

(58) Field of Classification Search
CPC .......... B60W 30/18009; B60W 20/10; B60W 10/10; B60W 10/02; B60W 10/08; Y10S 903/93
See application file for complete search history.

(56) References Cited

U.S. PATENT DOCUMENTS 5,172,602 A   12/1992   Juergens et al.
5,863,276 A    1/1999   Lee
(Continued)

FOREIGN PATENT DOCUMENTS

JP       10-2408 A    1/1998
JP    2002-13625 A    1/2002
(Continued)

OTHER PUBLICATIONS

International Search Report (PCT/ISA/210 and PCT/ISA/220) dated Jun. 25, 2013 with English translation (seven pages).
(Continued)

*Primary Examiner* — Derek D Knight
(74) *Attorney, Agent, or Firm* — Crowell & Moring LLP (57) ABSTRACT

If, in uphill deceleration determination procedure, it is determined that the vehicle is being decelerated on an uphill slope, a transmission shift lever is in D range, the motor is in order, the start gear is a first specified gear or lower, a to-be-selected traveling gear is a second specified gear or lower, an actual even-numbered gear is a third specified gear or higher, and actual odd-numbered gear is a fourth specified gear or higher, a first, a second and a third synchronizer mechanisms are put in neutral position to create a state in which no gear is selected. Then, a shift to a gear suited for re-acceleration is conducted by activating operating the first, second and the third synchronizer mechanisms.

6 Claims, 8 Drawing Sheets

(51) Int. Cl.
   *B60K 6/547*    (2007.10)
   *F16H 61/688*   (2006.01)
   *F16H 61/02*    (2006.01)
   *B60W 10/113*   (2012.01)
   *B60W 10/10*    (2012.01)
   *F16H 61/04*    (2006.01)
   *B60W 10/02*    (2006.01)
   *B60W 10/08*    (2006.01)
   *B60W 20/00*    (2006.01)
   *F16H 59/66*    (2006.01)
   *F16H 3/093*    (2006.01)

(52) U.S. Cl.
   CPC ............ *F16H 61/0213* (2013.01); *F16H 61/04* (2013.01); *F16H 61/688* (2013.01); *B60W 20/00* (2013.01); *B60W 2550/142* (2013.01); *F16H 2003/0933* (2013.01); *F16H 2059/663* (2013.01); *Y02T 10/6221* (2013.01); *Y10S 903/93* (2013.01)

(56) References Cited

U.S. PATENT DOCUMENTS

| | | | |
|---|---|---|---|
| 8,574,123 B2* | 11/2013 | Nedorezov et al. | 477/92 |
| 8,632,434 B2* | 1/2014 | Kira et al. | 475/151 |
| 2012/0304789 A1 | 12/2012 | Misu et al. | |
| 2015/0072831 A1* | 3/2015 | Sakata | 477/5 |

FOREIGN PATENT DOCUMENTS

| | | |
|---|---|---|
| JP | 2008-25639 A | 2/2008 |
| JP | 2009-286247 A | 12/2009 |
| JP | 2010-36781 A | 2/2010 |
| JP | 2010-76543 A | 4/2010 |
| JP | 2011-2007 A | 1/2011 |
| JP | 2012-247017 A | 12/2012 |

OTHER PUBLICATIONS

Japanese-language Written Opinion (PCT/ISA/237) dated Jun. 25, 2013 (four pages).

* cited by examiner

| GEAR | KA | KB | A | B | C |
|---|---|---|---|---|---|
| FIRST | E | D | N | F | R |
| SECOND | D | E | N | N | R |
| THIRD | E | D | R | N | N |
| FOURTH | D | E | N | R | N |
| FIFTH | E | D | F | N | N |
| SIXTH | D | E | F | F | N |
| REVERSE | E | D | N | F | F |

VEHICLE SHIFT CONTROL DEVICE

FIELD OF THE INVENTION

Exemplary embodiments of the present invention relate to a gear-shift control apparatus for a vehicle, specifically gear-shift control performed when the vehicle is decelerated and then re-accelerated on an uphill slope.

BACKGROUND OF THE INVENTION

In the field of automotive transmissions, there are known mechanical automatic transmissions designed such that actuators perform gear operations (gear selection and shift) and clutch operations, instead of a driver manually doing these as in manual transmissions, thereby accomplishing automatic gear shifts. As one type of such mechanical automatic transmission, there is known a dual-clutch automatic transmission which has two clutches to transmit torque to gears and conducts gear shifts in the manner alternately transmitting drive torque to gears belonging to different groups.

In the dual-clutch automatic transmission, in order to reduce drive torque variations accompanying the clutch operations for gear shifts and reduce time taken for gear shifts, a process called "pre-shift" is performed. Specifically, the gear to be selected next is determined from vehicle traveling state and others and preselected while its associated clutch is disconnected, or on standby, and then, the gear shift is accomplished by engaging the standby clutch and disengaging the other clutch.

As exemplified by Japanese Patent Application Laid-open (Kokai) No. 2010-36781, there is known a dual-clutch automatic transmission for a hybrid vehicle having an internal combustion engine and an electric motor as power sources, comprising a first and a second transmission units each having an input shaft, the input shaft of the first transmission unit engaging with a rotor of the electric motor, wherein a smooth gear shift is conducted by bringing the rotating speed of the input shaft of the first transmission unit to a desired level matching the vehicle speed and a gear to be selected next, by means of the electric motor, while no gear is selected in the first transmission unit, thereby enabling a skip gear shift in the first transmission unit with the clutch associated with the first transmission unit being kept engaged.

SUMMARY OF THE INVENTION

There are dual-clutch automatic transmissions configured such that a number of gears, or gear settings share gearwheels and synchronizer mechanisms, and thus, intended to conduct a step-by-step gear shift, namely down- or upshift from one gear to the next, sequentially.

In such dual-clutch automatic transmissions, when the vehicle traveling on an uphill slope at high speed is decelerated and then re-accelerated, a shift from a high-speed gear to a low-speed gear suited for re-acceleration is needed, but since the gears share gearwheels and synchronizer mechanisms, such downshift needs to be conducted in a step-by-step manner.

In this situation, such step-by-step gear shift is unfavorable, since it takes much time to accomplish the desired gear shift, and thus, accomplish the desired re-acceleration, which possibly leads to an undesired decrease in vehicle speed, or in a worse case, backward moving of the vehicle due to the uphill slope.

In order to quickly accomplish the gear shift, Japanese Patent Application Laid-open (Kokai) No. 2010-36781 discloses a technique that allows a gear shift with the clutch kept engaged. However, it is difficult to apply this technique to the dual-clutch automatic transmission intended to conduct a down- and an upshift in a step-by-step manner, since this type of dual-clutch automatic transmission is configured such that the gears share gearwheels and synchronized mechanisms.

Exemplary embodiments of the present invention are directed to solving this problem and provide a gear-shift control apparatus for a vehicle which can prevent the vehicle from moving backward when decelerated and then re-accelerated on an uphill slope.

In order to achieve the above object, a gear-shift control apparatus for a vehicle comprises a speed-change unit including two input shafts to which power from an internal combustion engine mounted on the vehicle as a power source is transmitted, each input shaft being provided with a clutch allowing or interrupting power transmission from the internal combustion engine to the input shaft, secondary shafts arranged parallel to the two input shafts, gearwheels arranged on the two input shafts and the secondary shafts to provide more than one gear setting, and more than one switch units for changing engagement between the gearwheels, the speed-change unit being designed to conduct a shift to an optimal gear setting by up- or downshifting from one gear setting to the next, step by step, by activating the switch unit, so that power from the internal combustion engine is supplied from an output shaft at a desired speed-torque ratio; a gear-shift control unit controlling the clutches associated with the respective input shafts and the switch units; a road surface detection unit detecting state of a road surface on which the vehicle is traveling; and a traveling state detection unit detecting traveling state of the vehicle, wherein when determining that the vehicle is decelerated and then re-accelerated on an uphill slope, from information from the road surface detection unit and the traveling state detection unit, the gear-shift control unit performs uphill gear-shift control to create a state in which no gear setting is selected and then conduct a shift to a gear setting suited for re-acceleration.

In accordance with the invention the gear settings include a first gear setting selected by activating only a first one of the switch units, and a second gear setting which is adjacent in sequence to the first gear setting and which is selected by activating more than one of the switch units including the first switch unit, and when determining that the second gear setting is suited for re-acceleration, the gear-shift control unit performs gear protection control to first shift to the first gear setting and then shift to the second gear setting.

The vehicle can be a hybrid vehicle having an electric motor mounted on a first one of the two input shafts as a power source and designed such that power from at least either the internal combustion engine or the electric motor is transmitted via the speed-change unit to the output shaft, and with the gear settings being grouped into a first group of gear settings each established including the first input shaft and thus transmitting power from the electric motor to the output shaft, and a second group of gear settings each established including the other input shaft and not transmitting power from the electric motor to the output shaft, wherein the gear-shift control apparatus further comprises an electric motor control unit controlling operation of the electric motor, and after a shift to a gear setting belonging to the first group, the electric motor control unit actuates the electric motor to produce torque.

The gear-shift control apparatus can also comprise a speed-change unit intended to conduct a step-by-step shift between gear settings arranged such that, when the vehicle traveling on an uphill slope is decelerated and then re-accelerated, it creates a state in which no gear setting is selected and then conducts a shift to a gear setting suited for re-acceleration. This obviates the need to conduct a sequential step-by-step downshift to a gear setting suited for re-acceleration, when the vehicle traveling on an uphill slope at high speed and thus with a high-speed gear setting selected is decelerated and then re-accelerated, for example.

The gear-shift control apparatus thus enables a quick shift to a gear setting suited for re-acceleration, thereby preventing the vehicle from moving backward when decelerated and then re-accelerated on an uphill slope.

The gear settings include a first gear setting selected by activating only a first one of the switch units, and a second gear setting adjacent in sequence to the first gear setting and which is established by activating more than one of the switch units including the first switch unit, and when determining that the second gear setting is suited for re-acceleration, the gear-shift control unit first conducts a shift to the first gear setting and then conducts a shift to the second gear setting.

First shifting to the first gear setting and then shifting to the second gear setting prevents the switch units activated to select the second gear setting from being simultaneously subjected to a torque transmitted to the speed-change unit from the tires via the axle, for example, and an inertial torque from the secondary shaft constituting the first gear setting or the clutch provided for the input shaft constituting the second gear setting, each rotating through inertia. The switch units are thus protected against damage.

The invention can be applied to a hybrid vehicle having an electric motor mounted on a first one of the two input shafts as a power source and with the gear settings being grouped into a first group of gear settings each established including the first input shaft and thus transmitting power from the electric motor to the output shaft, and a second group of gear settings each established including the other input shaft and not transmitting power from the electric motor to the output shaft, further comprises an electric motor control unit controlling operation of the electric motor, and after a shift to a gear setting belonging to the first group, the electric motor control unit actuates the electric motor to produce drive torque. The power produced by the electric motor and supplied from the output shaft, after the shift to the gear setting belonging to the first group, prevents the vehicle from moving backward.

DETAILED DESCRIPTION

An embodiment of the present invention will now be described with reference to the drawings attached.

Figure 1:
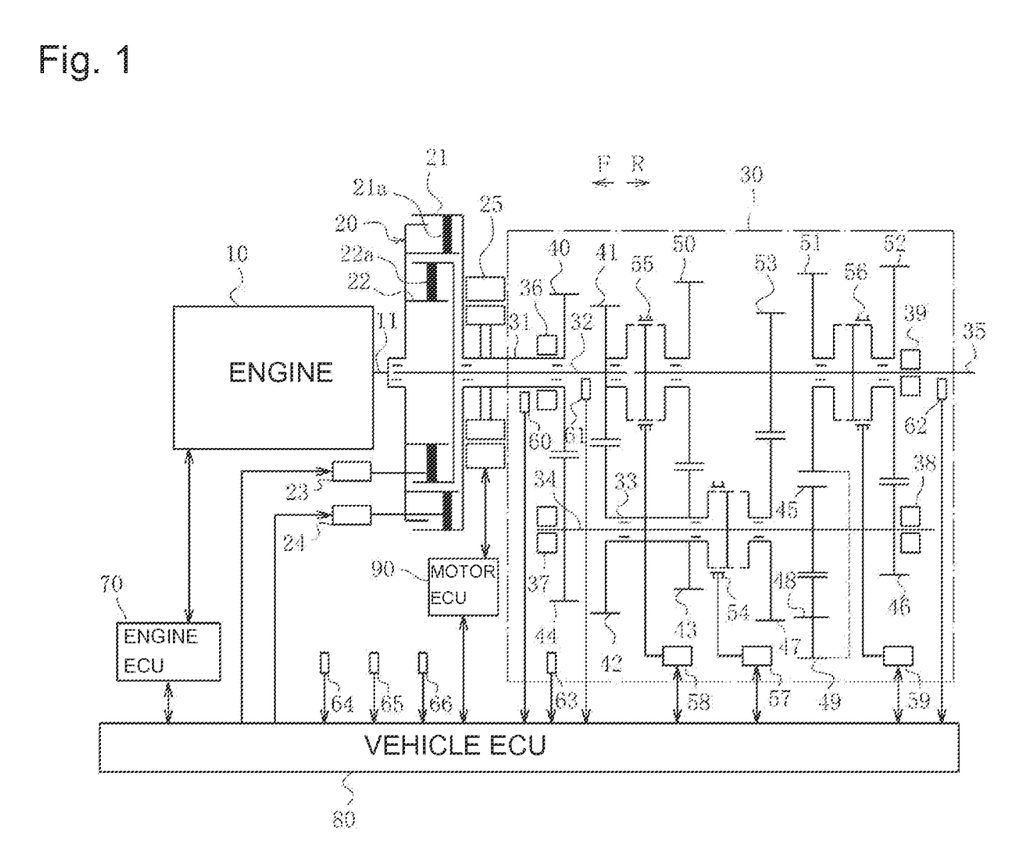
FIG. 1 is a diagram schematically showing the configuration of a gear-shift control apparatus for a vehicle according to the present invention.

FIG. 1 is a diagram schematically showing the configuration of an embodiment of gear-shift control apparatus for a vehicle according to the present invention. "F" and "R" in the Figure each indicate the direction in which synchronizer mechanisms move. FIGS. 2 to 8 show a drive power transmission path formed when the transmission is in first to sixth and reverse gears, respectively. In the Figures, the drive power transmission path is indicated by bold solid lines. FIG. 9 shows the operating states of clutches and synchronizer mechanisms. In the Figure, "D" and "E" denote the clutch being disengaged and the clutch being engaged, respectively. "KA" denotes an inner clutch, "KB" an outer clutch, "A" a first synchronizer mechanism, "B" a second synchronizer mechanism and "C" a third synchronizer mechanism. "N" denotes neutral position, "F" the synchronizer mechanism's moving in the direction "F" in FIG. 1, and "R" the synchronizer mechanism's moving in the direction "R" in FIG. 1. Next, the configuration of the gear-shift control apparatus for the vehicle will be described.

As shown in FIG. 1, the gear-shift control apparatus for the vehicle, installed on a vehicle not shown, can be divided into the following components: an engine (internal combustion engine) 10, a clutch unit 20, a motor (electric motor) 25, a mechanical automatic transmission (hereinafter referred to simply as "transmission") (speed-change unit) 30, an engine electronic control unit (referred to as "engine ECU") 70, a motor electronic control unit (referred to as "motor ECU") (electric motor control unit) 90 and a vehicle electronic control unit (referred to as "vehicle ECU") (gear-shift control unit) 80. These components are electrically connected to each other.

The vehicle with this gear-shift control apparatus installed is designed such that the engine 10, a traveling power source, is connected to the transmission 30 by the clutch unit 20 so that the vehicle travels on power transmitted from the engine 10 to left and right drive wheels, not shown, via the clutch unit 20 and the transmission 30. The configuration that the power from the engine 10 is transmitted to the drive wheels via the clutch unit 20 and the transmission 30 enables the vehicle to travel with the drive wheels being powered at a speed-torque ratio depending on the selected gear of the transmission 30. The motor 25 is mounted on an outer input shaft 31 of the transmission 30. Power from the motor 25 is therefore transmitted to the drive wheels via the transmission 30. The vehicle is thus designed as a hybrid vehicle that can travel on power from the engine 10 and the motor 25.

The engine 10 produces power depending on how much the driver depresses an accelerator pedal, not shown. The power is transmitted from an output shaft 11. The engine 10 is fitted with a crank angle sensor, not shown, to detect rotating speed of the engine 10.

As seen in FIG. 1, the clutch unit 20 comprises an outer clutch (clutch) 21 and an inner clutch (clutch) 22. The input of the clutch unit 20 serves as the input of the outer clutch 21 as well as the input of the inner clutch 22. The outer and inner clutches 21, 22 are independently engaged and disengaged by clutch actuators 23, 24 operating wet multiple-plate clutches 21a, 22b constituting the outer and inner clutches, respectively. With either of the clutches engaged, power is transmitted from the engine 10 to the output of the clutch.

The motor 25 is mounted on the outer input shaft 31 of the transmission 30. Depending on the operating state of the vehicle, the motor 25 produces power to drive the drive wheels, or performs regenerative braking by absorbing power from the drive wheels. The motor 25 is controlled by the motor ECU 90.

The transmission 30 comprises an outer input shaft (input shaft) 31 arranged coaxially with the clutch unit 20, an inner input shaft (input shaft) 32 rotatably arranged within the outer input shaft 31, an outer counter shaft (secondary shaft) 33 arranged parallel with the outer input shaft 31 with a space between, an inner counter shaft (secondary shaft) 34 rotatably arranged within the outer counter shaft 33, a reverse shaft (secondary shaft) 48 arranged parallel with the outer input shaft 31 with a space between, and an output shaft (output shaft) 35 arranged coaxially with the outer input shaft 31.

Power is transmitted to the outer input shaft 31 from the output shaft 11 of the engine 10 via the outer clutch 21, and power is transmitted from the output shaft 11 via the inner clutch 22 to the inner input shaft 32. The outer input shaft 31 is rotatably supported by a bearing 36, the inner counter shaft 34 by bearings 37, 38, and the output shaft 35 by a bearing 39.

An outer-clutch drive gear (gearwheel) 40 is fixed on the outer input shaft 31, and an inner-clutch drive gear (gearwheel) 41 is fixed on the inner input shaft 32.

An inner-clutch driven gear (gearwheel) 42 and a third-gear drive gear (gearwheel) 43 are fixed on the outer counter shaft 33. On the inner counter shaft 34, an outer-clutch driven gear (gearwheel) 44, a reverse drive gear (gearwheel) 45, and a first-second-gear drive gear (gearwheel) 46 are fixed, and a fourth-gear drive gear (gearwheel) 47 is mounted to be able to rotate relative to the inner counter shaft. On the outer counter shaft 33 a second synchronizer mechanism (switch unit) 54 slidable along the axis of the outer counter shaft 33 to connect the third-gear drive gear 43 or the fourth-gear drive gear 47 to the inner counter shaft 34 is also provided.

A reverse intermediate gear (gearwheel) 49 is fixed on the reverse shaft 48.

On the output shaft ("output shaft" in claim 35, a third-gear driven gear (gearwheel) 50, a reverse driven gear (gearwheel) 51 and a first-second-gear driven gear (gearwheel) 52 are mounted to be able to rotate relative to the output shaft, and a fourth-gear driven gear (gearwheel) 53 is fixed. On the output shaft 35 a first synchronizer mechanism (switch unit) 55 slidable along the axis of the output shaft 35 to connect the inner-clutch drive gear 41 or the third-gear driven gear 50 to the output shaft 35, and a third synchronizer mechanism (switch unit) 56 slidable along the axis of the output shaft 35 to connect the reverse driven gear 51 or the first-second-gear driven gear 52 to the output shaft 35 are also provided.

The outer-clutch drive gear 40 and the outer-clutch driven gear 44 are constantly meshed together, the inner-clutch drive gear 41 and the inner-clutch driven gear 42 are constantly meshed together, the third-gear drive gear 43 and the third-gear driven gear 50 are constantly meshed together, the reverse drive gear 45 and the reverse intermediate gear 49 are constantly meshed together, the reverse intermediate gear 49 and the reverse driven gear 51 are constantly meshed together, the first-second-gear drive gear 46 and the first-second-gear driven gear 52 are constantly meshed together, and the fourth-gear drive gear 47 and the fourth-gear driven gear 53 are constantly meshed together.

The second synchronizer mechanism 54 is operated by a gear shift actuator 57 controlled by the vehicle ECU 80. The first synchronizer mechanism 55 is operated by a gear shift actuator 58 controlled by the vehicle ECU 80. The third synchronizer mechanism 56 is operated by a gear shift actuator 59 controlled by the vehicle ECU 80.

The gear shift actuators 57, 58, 59 have a function of detecting engagement between gearwheels, from the operating states of their associated synchronizer mechanisms, i.e., the second, the first and the third synchronizer mechanisms 54, 55, 56.

The transmission 30 is fitted with a first rotation sensor 60 to detect rotating speed of the outer input shaft 31, a second rotation sensor 61 to detect rotating speed of the inner input shaft 32, and a speed sensor 62 to detect vehicle speed from the rotating speed of the output shaft 35. The transmission 30 is also fitted with a temperature sensor 63 to detect temperature of a lubricant of the transmission 30.

The engine ECU 70 is a control device performing general control over the engine 10, and comprises an input-output device, memory (including ROM, RAM and non-volatile RAM), a central processing unit (CPU) and others.

To the input of the engine ECU 70, sensors including a crank angle sensor, an air flow sensor and an accelerator position sensor detecting how much the accelerator pedal is operated by the driver of the vehicle equipped with the engine 10, which sensors are not shown, are electrically connected, in addition to the vehicle ECU 80, so that information and others are fed from these sensors to the engine ECU.

To the output of the engine ECU 70, devices including a fuel injection valve, not shown, are electrically connected, in addition to the vehicle ECU 80.

The engine ECU 70 controls operation of the engine 10 depending on information from the sensors and vehicle information from the vehicle ECU 80.

The motor ECU (electric motor control unit) 90 makes the motor 25 operate as a motor under powering control or makes the motor operate as a generator under regenerative control. Under the powering control, the motor 25 produces drive torque determined by the vehicle ECU 80 so that the vehicle can travel in a mode determined by the vehicle ECU 80.

The vehicle ECU 80 is a control device performing general control over the vehicle, and comprises an input-output device, memory (including ROM, RAM and non-volatile RAM), a central processing unit (CPU) and others, similarly to the engine ECU 70.

To the input of the vehicle ECU 80, sensors including the gear shift actuators 57, 58, 59, the first rotation sensor 60, the second rotation sensor 61, the vehicle speed sensor 62, the temperature sensor 63, a brake pressure sensor 64 detecting brake pressure, or pressure of a hydraulic oil in a brake system, not shown, an inclination sensor 64 detecting inclination of the vehicle, and thus, of a road surface, and a vehicle load sensor 66 detecting loads on the vehicle, including the weight of cargo on the vehicle, are electrically connected, in addition to the engine ECU 70 and the motor ECU 90, so that information and others are fed from these sensors to the vehicle ECU 80.

In addition to the engine ECU 70 and the motor ECU 90, devices including the actuators 23, 24 and the gear shift actuators 57, 58, 59 are electrically connected to the output of the vehicle ECU 80.

Depending on information from the sensors and vehicle information from the engine ECU 70 and the motor ECU 90, the vehicle ECU 80 operates the outer and inner clutches 21, 22 and activates the second, first and third synchronizer mechanisms 54, 55 and 56, to change engagement between gears and shafts, thereby putting the transmission 30 in a gear selected from first to sixth forward gears and reverse. With the outer clutch 21 engaged, the vehicle can travel on power from the engine 10 transmitted via an even-numbered gear. With the inner clutch 22 engaged, the vehicle can travel on power from the engine 10 transmitted via an odd-numbered gear or reverse. The vehicle ECU 80 can also make the vehicle travel on power from the motor 25, by creating a gear engagement connecting the outer input shaft 31 to the output shaft 35 by activating the second, first and third synchronizer mechanisms 54, 55, 56. The vehicle ECU 80 can further perform a process called "pre-shift", namely, while the outer or inner clutch 21 or 22 is engaged, preselect a gear which is adjacent in gear sequence to the gear in use and associated with the disengaged clutch, and then accomplish the gear shift by operating the outer and inner clutches 21, 22.

Figure 2:
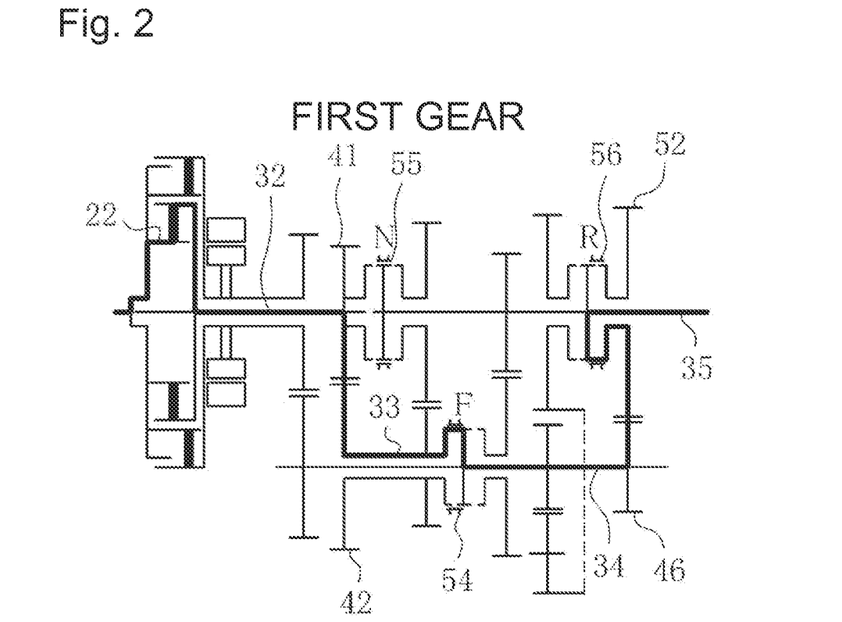
FIG. 2 is a diagram showing a drive power transmission path formed when a transmission constituting the gear-shift control apparatus for the vehicle according to the present invention is in first gear.

Specifically, the transmission is put in first gear ("second gear setting which is selected by activating more than one of the switch unit" in claims) shown in FIG. 2, by disengaging the outer clutch 21, engaging the inner clutch 22, putting the first synchronizer mechanism 55 in neutral (N) position, moving the second synchronizer mechanism forward (F), thereby connecting the outer counter shaft 33 and the inner counter shaft 34 together, and moving the third synchronizer mechanism 56 rearward (R), thereby connecting the output shaft 35 and the first-second-gear driven gear 52 together, as indicated in FIG. 9. As a result, power from the engine 10 is transmitted to the inner input shaft ("the other input shaft" in claim 32, the inner-clutch drive gear 41, the inner-clutch driven gear 42, the outer counter shaft 33, the second synchronizer mechanism 54, the inner counter shaft 34, the first-second-gear drive gear 46, the first-second-gear driven gear 52, the third synchronizer mechanism 56, and the output shaft 35, serially, and fed from the output shaft 35 as drive power making the drive wheels rotate forward. First gear is thus selected by activating both the second and the third synchronizer mechanisms 54, 56.

Figure 3:
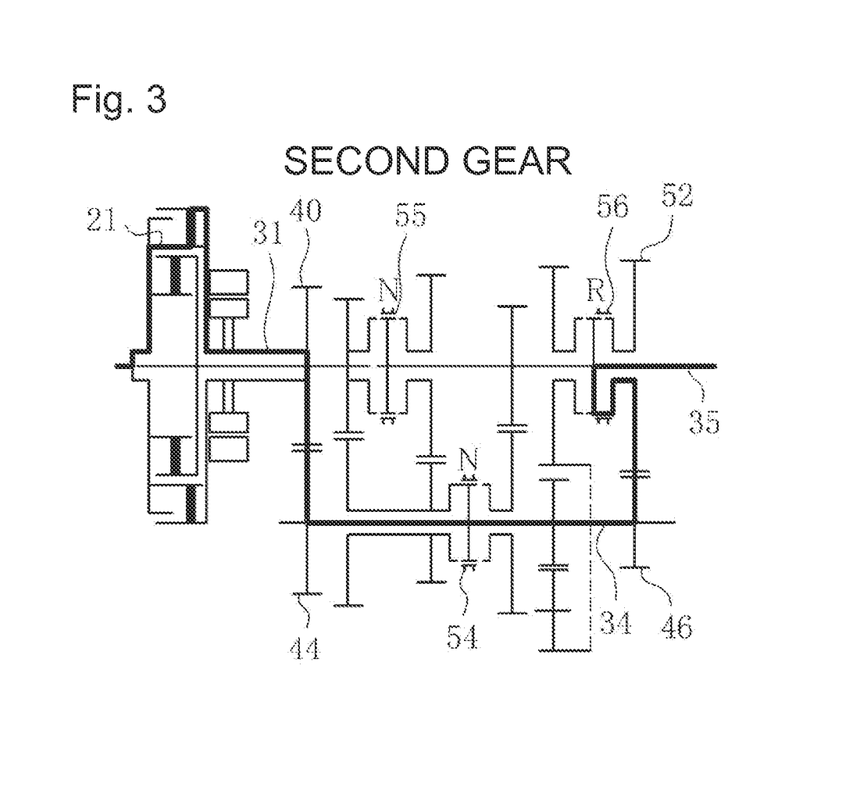
FIG. 3 is a diagram showing a drive power transmission path formed when the transmission constituting the gear-shift control apparatus for the vehicle according to the present invention is in second gear.

The transmission is put in second gear ("first gear setting which is selected by activating only a first one of the switch units" in claims) shown in FIG. 3, by disengaging the inner clutch 22, engaging the outer clutch 21, putting the first and the second synchronizer mechanisms 55, 54 in neutral (N) position, and moving the third synchronizer mechanism ("first switch unit" in claims) rearward (R), thereby connecting the output shaft 35 and the first-second-gear driven gear 52 together, as indicated in FIG. 9. As a result, power from the engine 10 is transmitted to the outer input shaft ("first input shaft" in claim 31, the outer-clutch drive gear 40, the outer-clutch driven gear 44, the inner counter shaft 34, the first-second-gear drive gear 46, the first-second-gear driven gear 52, the third synchronizer mechanism 56, and the output shaft 35, serially, and fed from the output shaft 35 as drive power making the drive wheels rotate forward. Second gear is thus selected by activating only the third synchronizer mechanism 56. If the first synchronizer mechanism 55 is moved rearward (R) in advance, an upshift to third gear is accomplished only by operating the inner and the outer clutches 22, 21.

Figure 4:
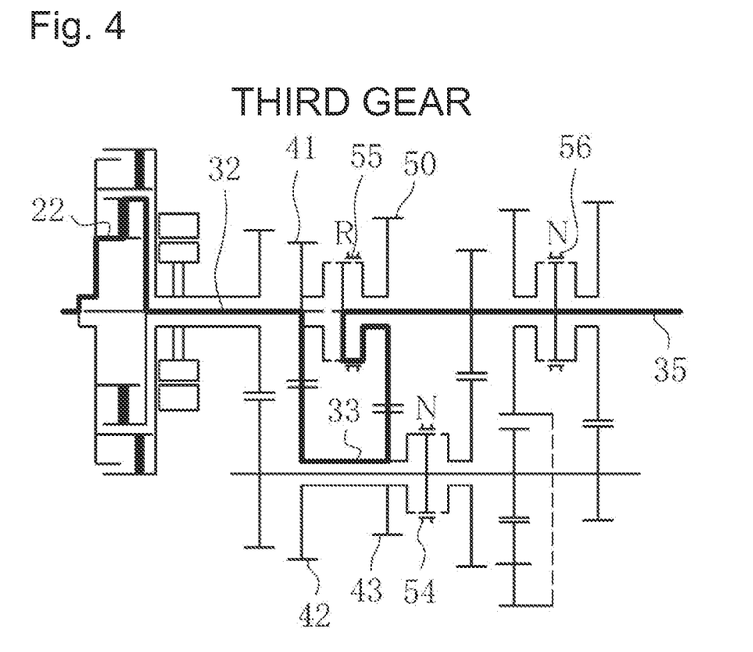
FIG. 4 is a diagram showing a drive power transmission path formed when the transmission constituting the gear-shift control apparatus for the vehicle according to the present invention is in third gear.

The transmission is put in third gear shown in FIG. 4, by disengaging the outer clutch 21, engaging the inner clutch 22, putting the second and the third synchronizer mechanisms 54, 56 in neutral (N) position, and moving the first synchronizer mechanism 55 rearward (R), thereby connecting the output shaft 35 and the third-gear driven gear 50 together, as indicated in FIG. 9. As a result, power from the engine 10 is transmitted to the inner input shaft 32, the inner-clutch drive gear 41, the inner-clutch driven gear 42, the outer counter shaft 33, the third-gear drive gear 43, the third-gear driven gear 50, the first synchronizer mechanism 55, and the output shaft 35, serially, and fed from the output shaft 35 as drive power making the drive wheels rotate forward. Third gear is thus selected by activating only the first synchronizer mechanism 55. If the second synchronizer mechanism 54 is moved rearward (R) in advance, an upshift to fourth gear is accomplished only by operating the inner and the outer clutches 22, 21.

Figure 5:
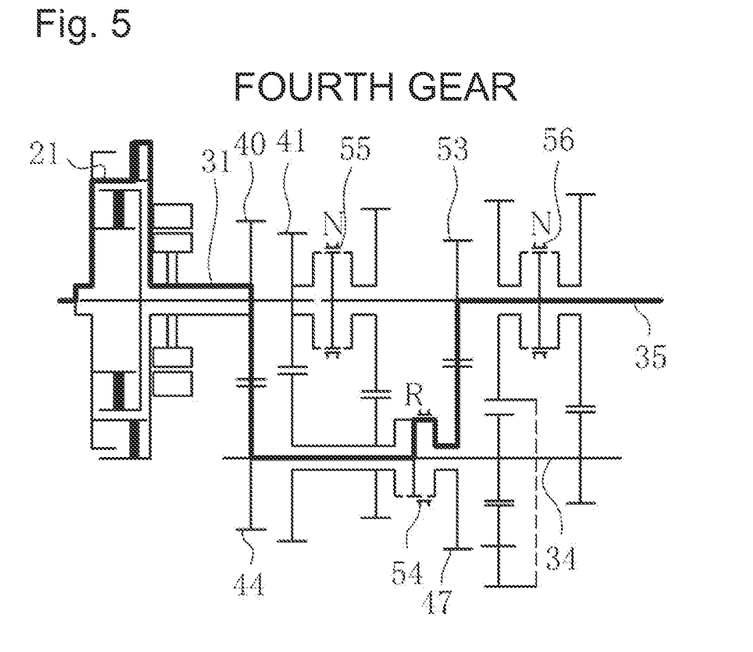
FIG. 5 is a diagram showing a drive power transmission path formed when the transmission constituting the gear-shift control apparatus for the vehicle according to the present invention is in fourth gear.

The transmission is put in fourth gear shown in FIG. 5, by disengaging the inner clutch 22, engaging the outer clutch 21, putting the first and the third synchronizer mechanisms 55, 56 in neutral (N) position, and moving the second synchronizer mechanism 54 rearward (R), thereby connecting the output shaft 35 and the fourth-gear drive gear 47 via the fourth-gear driven gear 53, as indicated in FIG. 9. As a result, power from the engine 10 is transmitted to the outer input shaft 31, the outer-clutch drive gear 40, the outer-clutch driven gear 44, the inner counter shaft 34, the second synchronizer mechanism 54, the fourth-gear drive gear 47, the fourth-gear driven gear 53, and the output shaft 35, serially, and fed from the output shaft 35 as drive power making the drive wheels rotate forward. Fourth gear is thus selected by activating only the second synchronizer mechanisms 54. If the first synchronizer mechanism 55 is moved forward (F) in advance, an upshift to fifth gear is accomplished only by operating the inner and the outer clutches 22, 21.

Figure 6:
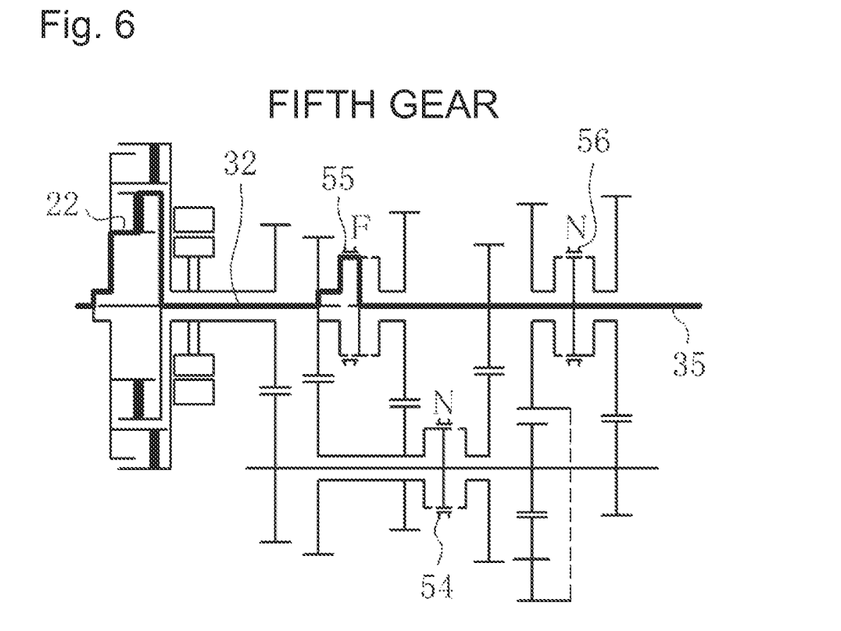
FIG. 6 is a diagram showing a drive power transmission path formed when the transmission constituting the gear-shift control apparatus for the vehicle according to the present invention is in fifth gear.

The transmission is put in fifth gear shown in FIG. 6, by disengaging the outer clutch 21, engaging the inner clutch 22, putting the second and the third synchronizer mechanisms 54, 56 in neutral (N) position, and moving the first synchronizer mechanism 55 forward (F), thereby connecting the output shaft 35 and the inner input shaft 32 together, as indicated in FIG. 9. As a result, power from the engine 10 is transmitted to the inner input shaft 32, the first synchronizer mechanism 55, and the output shaft 35, serially, and fed from the output shaft 35 as drive power making the drive wheels rotate forward. Fifth gear is thus selected by activating only the first synchronizer mechanism 55. If the second synchronizer mechanism 54 is moved forward (F) in advance, an upshift to sixth gear is accomplished only by operating the inner and the outer clutches 22, 21.

Figure 7:
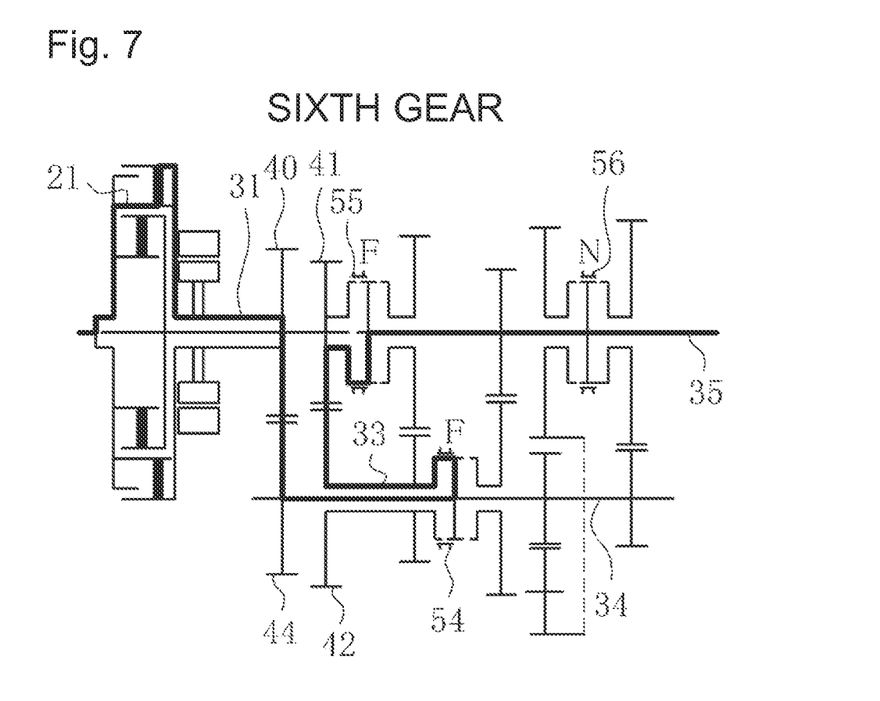
FIG. 7 is a diagram showing a drive power transmission path formed when the transmission constituting the gear-shift control apparatus for the vehicle according to the present invention is in sixth gear.

The transmission is put in sixth gear shown in FIG. 7, by disengaging the inner clutch 22, engaging the outer clutch 21, putting the third synchronizer mechanism 56 in neutral (N) position, moving the first synchronizer mechanism 55 forward (F), thereby connecting the outer counter shaft 33 and the inner counter shaft 34 together, and moving the second synchronizer mechanism 54 forward (F), thereby connecting the output shaft 35 and the inner-clutch drive gear 41 together. As a result, power from the engine 10 is transmitted to the outer input shaft 31, the outer-clutch drive gear 40, the outer-clutch driven gear 44, the inner counter shaft 34, the second synchronizer mechanism 54, the outer counter shaft 33, the inner-clutch driven gear 42, the inner-clutch drive gear 41, the first synchronizer mechanism 55, and the output shaft 35, serially, and fed from the output shaft 35 as drive power making the drive wheels rotate forward. Sixth gear is thus selected by activating both the first and the second synchronizer mechanisms 55, 54.

Figure 8:
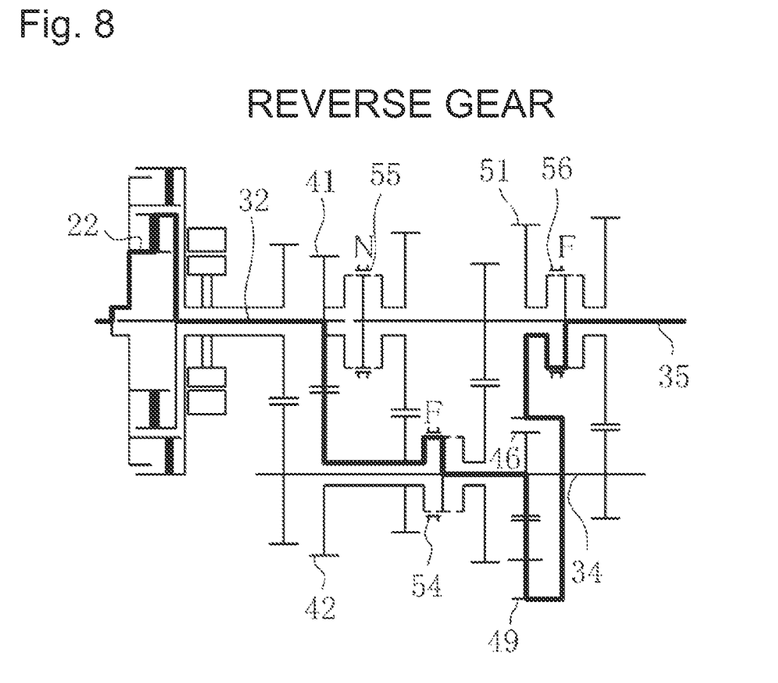
FIG. 8 is a diagram showing a drive power transmission path formed when the transmission constituting the gear-shift control apparatus for the vehicle according to the present invention is in reverse.
Figure 9:
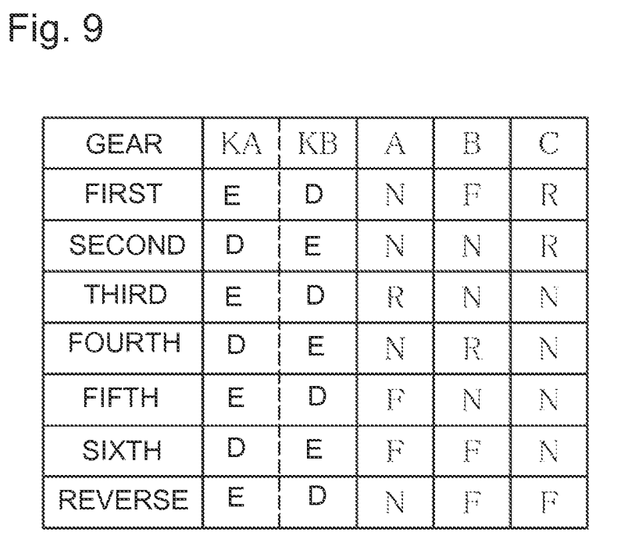
FIG. 9 is a diagram showing in what operating states clutches and synchronizer mechanisms are when the transmission constituting the gear-shift control apparatus for the vehicle according to the present invention is in the respective gears.

The transmission is put in reverse shown in FIG. 8, by disengaging the outer clutch 21, engaging the inner clutch 22, putting the first synchronizer mechanism 55 in neutral (N) position, and moving the second and the third synchronizer mechanisms 54, 56 forward (F), thereby connecting the output shaft 35 and the reverse driven gear 51 together. As a result, power from the engine 10 is transmitted to the inner input shaft 32, the inner-clutch drive gear 41, the inner-clutch driven gear 42, the outer counter shaft 33, the second synchronizer mechanism 54, the inner counter shaft 34, the reverse drive gear 45, the reverse intermediate gear 49, the reverse driven gear 51, the third synchronizer mechanism 56, and the output shaft 35, serially, and fed from the output shaft 35 as drive power making the drive wheels rotate rearward. Reverse gear is thus selected by activating both the second and the third synchronizer mechanisms 54, 56.

These gears are grouped into a first gear group consisting of even-numbered gears (second, fourth and sixth gears) which can transmit power from the motor 25 to the output shaft 35 and a second gear group consisting of odd-numbered gears (first, third and fifth gears) which do not transmit power from the motor 25 to the output shaft.

In the present embodiment, the motor 25 is mounted on the outer input shaft 31 downstream of the outer clutch 21. Thus, when a drive-torque request from the driver can be satisfied only by drive torque produced by the motor 25 and transmitted via an even-numbered gear, the outer clutch 21 may be disengaged.

In the transmission 30 shifted in the above-described manner, sixth, fourth and first gears share the second synchronizer mechanism 54, and sixth and third gears share the first synchronizer mechanism 55. Thus, in normal deceleration, the vehicle ECU 80 accomplishes a shift from sixth to first gear by, for example, downshifting from one gear to the next, step by step, or downshifting from sixth to fifth, then to second and then to first gear.

The vehicle ECU 80 conducts uphill deceleration determination, namely detects traveling state of the vehicle and determines whether the vehicle is being decelerated on an uphill slope. When determining that the vehicle is being decelerated on an uphill slope, the vehicle ECU 80 activates the first, second and third synchronizer mechanisms 55, 54, 56 to take neutral (N) position to create a state in which no gear is selected. Then, the vehicle ECU 80 conducts uphill deceleration forced gear reset control to shift to a gear suited for re-acceleration (to-be-selected travelling gear) by activating the first, second and third synchronizer mechanisms 55, 54, 56 ("uphill gear-shift control" in claims). In the uphill deceleration forced gear reset control, if the to-be-selected traveling gear is first gear (second gear setting), for example, the vehicle ECU 80 conducts uphill deceleration forced low-gear traveling control ("gear protection control" in claims) to first shift to second gear (first gear setting), then actuate the motor 25 to produce power, and then shift to first gear (second gear setting).

Next, uphill deceleration determination, uphill deceleration forced gear reset control, and uphill deceleration forced low-gear traveling control, conducted by the vehicle ECU 80 of the gear-shift control apparatus for the vehicle, configured as described above according to the present invention, will be described.

Figure 10:
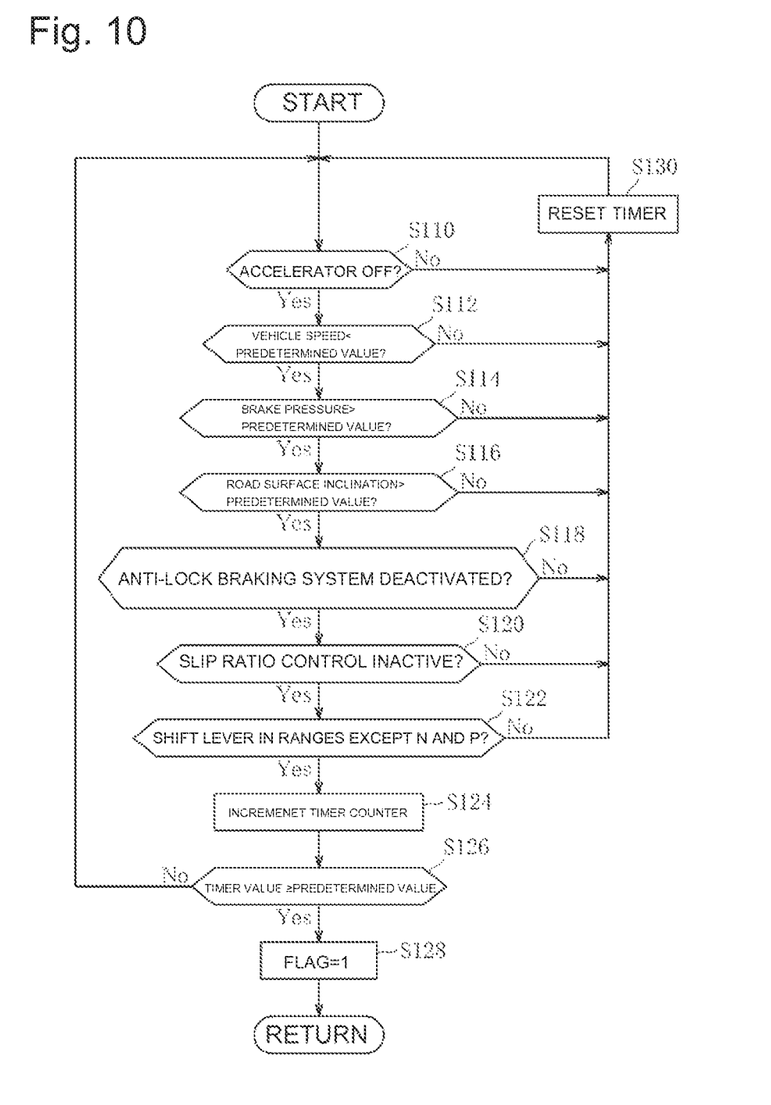
FIG. 10 is a flow chart showing uphill deceleration determination conducted by a vehicle ECU constituting the gear-shift control apparatus for the vehicle according to the present invention.
Figure 11:
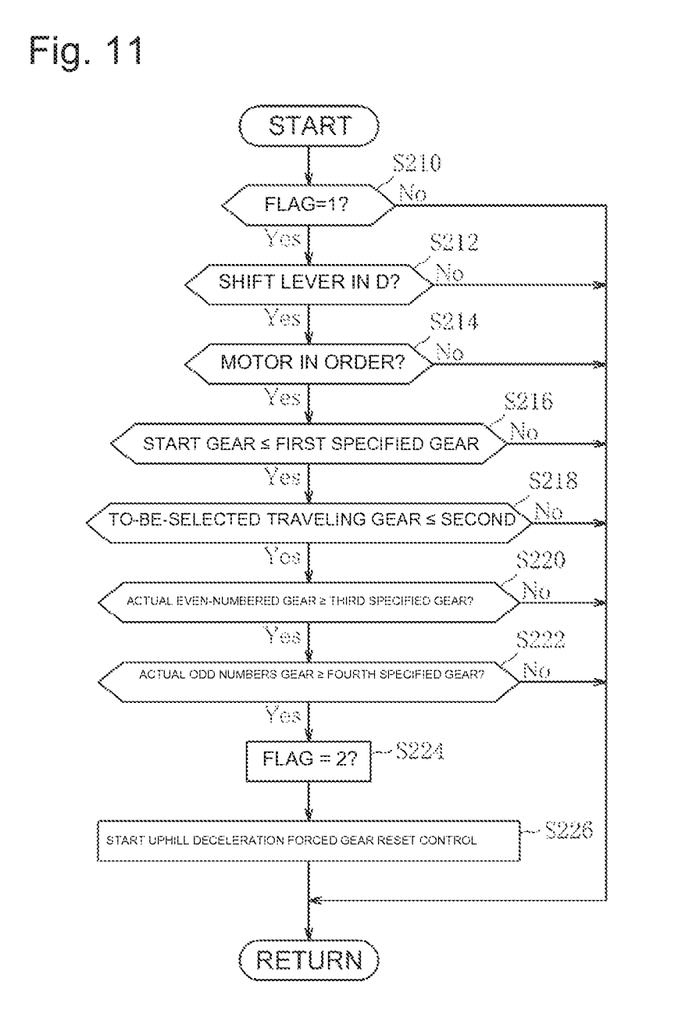
FIG. 11 is a flow chart showing uphill deceleration forced gear reset control conducted by the vehicle ECU constituting the gear-shift control apparatus for the vehicle according to the present invention.
Figure 12:
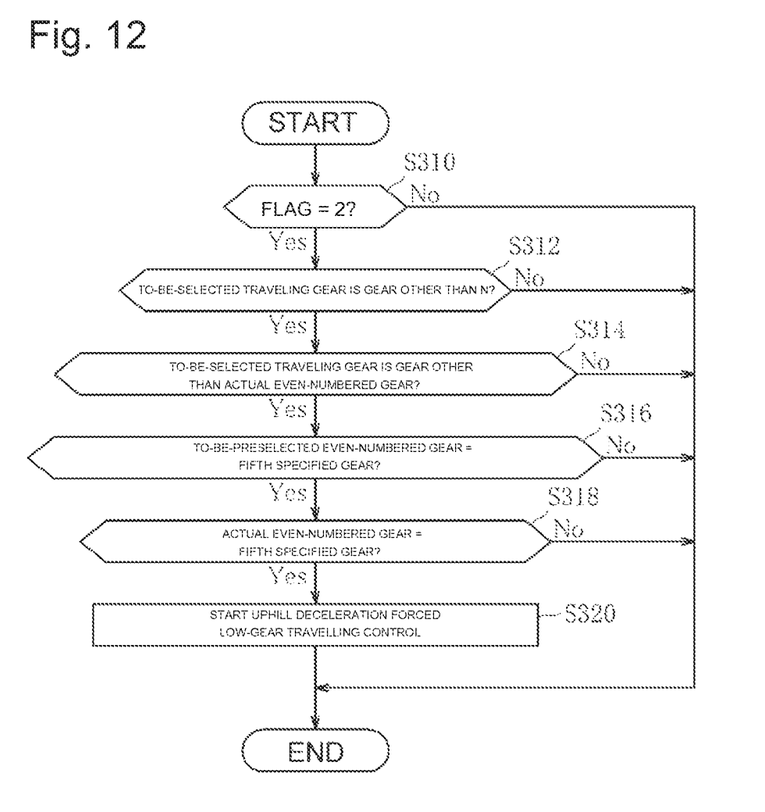
FIG. 12 is a flow chart showing uphill deceleration forced low-gear traveling control conducted by the vehicle ECU constituting the gear-shift control apparatus for the vehicle according to the present invention.

FIG. 10 is a flow chart showing uphill deceleration determination conducted by the vehicle ECU 80, FIG. 11 a flow chart showing uphill deceleration forced gear reset control conducted by the vehicle ECU 80, and FIG. 12 a flow chart showing uphill deceleration forced low-gear traveling control conducted by the vehicle ECU 80.

First, uphill deceleration determination will be described.

As shown in FIG. 10, at step S110, it is determined whether an accelerator is "OFF". Specifically, it is determined whether accelerator depression, detected by the accelerator position sensor, is 0. If the result of determination is "Yes", namely it is determined that the accelerator depression, detected by the accelerator position sensor, is 0, or in other words, the accelerator is "OFF", control flow goes to step S112. If the result of determination is "No", namely it is determined that the accelerator is not "OFF", control flow goes to step S130.

At step S112, it is determined whether the vehicle speed is less than a predetermined value. Specifically, it is determined whether the vehicle speed, detected by the speed sensor 62, is less than a predetermined value. If the result of determination is "Yes", namely it is determined that the vehicle speed is less than the predetermined value, control flow goes to step S114. If the result of determination is "No", namely it is determined that the vehicle speed is greater than or equal to the predetermined value, control flow goes to step S130.

At step S114, it is determined whether the brake pressure is greater than a predetermined value. In other words, it is determined whether the vehicle is being decelerated by the driver's operating the brake pedal. Specifically, it is determined whether the brake pressure, detected by the brake pressure sensor 64, is greater than a predetermined value. If the result of determination is "Yes", namely it is determined that the brake pressure is greater than the predetermined value, and thus, the vehicle is being decelerated by the driver's operating the brake pedal, control flow goes to step S116. If the result of determination is "No", namely it is determined that the brake pressure is less than or equal to the predetermined value, control flow goes to step S130.

At step S116, it is determined whether the road surface inclination is greater than a predetermined value. Specifically, it is determined whether the road surface inclination, detected by the inclination sensor 65, is greater than a predetermined value. If the result of determination is "Yes", namely it is determined that the road surface inclination is greater than the predetermined value, control flow goes to step S118. If the result of determination is "No", namely it is determined that the road surface inclination is less than or equal to the predetermined value, control flow goes to step S130.

At step S118, it is determined whether an anti-lock braking system is deactivated. If the result of determination is "Yes", namely it is determined that the anti-lock braking system is deactivated, control flow goes to step S120. If the result of determination is "No", namely it is determined that the anti-lock braking system is activated, control flow goes to step S130.

At step S120, it is determined whether slip ratio control is inactive. If the result of determination is "Yes", namely it is determined that the slip ratio control is inactive, control flow goes to step S122. If the result of determination is "No", namely it is determined that the slip ratio control is active, control flow goes to step S130.

At step S122, it is determined whether the transmission shift lever is in ranges except N and P ranges. If the result of determination is "Yes", namely it is determined that the transmission shift lever is in ranges except N and P ranges, control flow goes to step S124. If the result of determination is "No", namely it is determined that the transmission shift lever is in P or N range, control flow goes to step S130.

At step S124, a timer is incremented. Control flow then goes to step S126.

At step S126, it is determined whether the timer value is greater than or equal to a predetermine value. If the result of determination is "Yes", namely it is determined that the timer value is greater than or equal to the predetermine value, control flow goes to step S128. If the result of determination is "No", namely it is determined that the timer value is less than the predetermine value, control flow goes back to step S110.

At step S128, a flag is set to "1". Control flow then returns from this routine.

At step S130, the timer is reset. Control flow then returns to step S110.

As seen from the above, in uphill deceleration determination, when continuing determining, over a predetermined period of time, that the accelerator is "OFF" and the vehicle speed is less than the predetermined value and the vehicle is being decelerated by the driver's operating the brake pedal and the road surface inclination is greater than the predetermined value and the anti-lock braking system is deactivated and the slip ratio control is inactive and the transmission shift lever is in ranges except N and P ranges, the vehicle ECU 80 determines that the vehicle is being decelerated on an uphill slope.

Next, uphill deceleration forced gear reset control will be described.

As shown in FIG. 11, at step S210, it is determined whether the flag, which is set to "1" at step S128 in FIG. 10, is "1". In other words, whether it has been determined, in uphill deceleration determination, that the vehicle is being decelerated on an uphill slope is determined. If the result of determination is "Yes", namely it is determined that the flag is "1", which means that it has been determined in uphill deceleration determination that the vehicle is being decelerated on an uphill slope, control flow goes to step S212. If the result of determination is "No", namely it is determined that the flag is not "1", which means that it has not been determined in uphill deceleration determination that the vehicle is being decelerated on an uphill slope, control flow returns from this routine.

At step S212, it is determined whether the transmission shift lever is in D range. If the result of determination is "Yes", namely it is determined that the transmission shift lever is in D range, control flow goes to step S214. If the result of determination is "No", namely it is determined that the transmission shift lever is not in D range but in manual range, for example, control flow returns from this routine to give priority to the driver's gear shift operations.

At step S214, it is determined whether the motor 25 is in order. If the result of determination is "Yes", namely it is determined that the motor 25 is in order, control flow goes to step S216. If the result of determination is "No", namely it is determined that the motor 25 is not in order, control flow returns from this routine.

At step S216, it is determined whether or not start gear is a first specified gear (second gear, for example) or lower. If the result of determination is "Yes", namely it is determined that the start gear is the first specified gear or lower, control flow goes to step S218. If the result of determination is "No", namely it is determined that the start gear is higher than the first specified gear, control flow returns from this routine. The "start gear" means a gear to be selected in the vehicle parked. The start gear depends on road surface inclination and vehicle weight including cargo weight, and is determined using a map or other stored in advance. In the present embodiment, the start gear is selected from first to third gears, for example.

At step S218, it is determined whether or not to-be-selected traveling gear is a second specified gear (second gear, for example) or lower. The second specified gear is the highest gear that allows uphill deceleration forced gear resetting. If the result of determination is "Yes", namely it is determined that the to-be-selected traveling gear is the second specified gear or lower, control flow goes to step S220. If the result of determination is "No", namely it is determined that the to-be-selected traveling gear is higher than the second specified gear, control flow returns from this routine. The to-be-selected traveling gear is determined according to varying vehicle traveling state to be actually used in vehicle traveling. The to-be-selected traveling gear depends on accelerator depression and vehicle speed, and is determined using a map or other stored in advance.

At step S220, it is determined whether or not actual even-numbered gear is a third specified gear (fourth gear, for example) or higher. If the result of determination is "Yes", namely it is determined that the actual even-numbered gear is the third specified gear or higher, control flow goes to step S222. If the result of determination is "No", namely it is determined that the actual even-numbered gear is lower than the third specified gear, control flow returns from this routine. The "actual even-numbered gear" means an even-numbered gear actually established, namely actually selected or preselected.

At step S222, it is determined whether or not actual odd-numbered gear is a fourth specified gear (fifth gear, for example) or higher. If the result of determination is "Yes", namely it is determined that the actual odd-numbered gear is the fourth specified gear or higher, control flow goes to step S224. If the result of determination is "No", namely it is determined that the actual odd-numbered gear is lower than the fourth specified gear, control flow returns from this routine. The "actual odd-numbered gear" means an odd-numbered gear actually established, namely actually selected or preselected.

At step S224, the flag is set to "2". Control flow then goes to step S226.

At step S226, uphill deceleration forced gear resetting is started. Specifically, the first, second and third synchronizer mechanisms 55, 54, 56 are activated to take neutral (N) position to create a state in which no gear is selected ("state in which no gear setting is selected" in claims). Then, the first, second and third synchronizer mechanisms 55, 54, 56 are activated to take positions causing the to-be-selected traveling gear, or gear suitable for re-acceleration to become selected. Control flow then returns from this routine.

Suppose that uphill deceleration forced gear reset control (uphill gear-shift control) is performed when the vehicle traveling in sixth gear (with fifth gear preselected) is decelerated on an uphill slope, wherein the to-be-selected traveling gear is second gear, and the start gear, determined depending on road surface inclination and vehicle weight including cargo weight, is first gear. Since the vehicle is being decelerated on an uphill slope, the flag is "1". If the transmission selector lever is in D range and the motor 25 is in order, the first, second and third synchronizer mechanisms 55, 54, 56 are activated to take neutral (N) position to create a state in which no gear is selected or preselected, since the start gear is first gear, and thus, lower than the first specified gear (second gear in the present example), the to-be-selected traveling gear is second gear, and thus, equal to the second specified gear (second gear in the present example), the actual even-numbered gear is sixth gear, and thus, higher than the third specified gear (fourth gear in the present example), and the actual odd-numbered gear is fifth gear, and thus, equal to the fourth specified gear (fifth gear in the present example). Then, the third synchronizer mechanism 56 is activated to accomplish a shift to the to-be-selected traveling gear, namely second gear.

Next, uphill deceleration forced low-gear traveling control (gear protection control) will be described. This control is performed during uphill deceleration forced gear resetting.

As shown in FIG. 12, at step S310, it is determined whether the flag is "2". Specifically, it is determined whether the uphill deceleration forced gear reset control is being performed. If the result of determination is "Yes", namely it is determined that the flag is "2", which means that the uphill deceleration forced gear reset control is being performed, control flow goes to step S312. If the result of determination is "No", namely it is determined that the flag is not "2", which means that the uphill deceleration forced gear reset control is not being performed, control flow returns from this routine.

At step S312, it is determined whether the to-be-selected traveling gear is a gear other than neutral (N). If the result of determination is "Yes", namely it is determined that the to-be-selected traveling gear is a gear other than neutral (N), control flow goes to step S314. If the result of determination is "No", namely it is determined that the to-be-selected traveling gear is neutral (N), the routine is quitted.

At step S314, it is determined whether the to-be-selected traveling gear is a gear other than the actual even-numbered gear (namely, the actual odd-numbered gear). If the result of determination is "Yes", namely it is determined that the to-be-selected traveling gear is a gear other than the actual even-numbered gear, control flow goes to step S316. If the result of determination is "No", namely it is determined that the to-be-selected traveling gear is the actual even-numbered gear, the routine is quitted.

At step S316, it is determined whether to-be-preselected even-numbered gear is a fifth specified gear (second gear, for example). If the result of determination is "Yes", namely it is determined that the to-be-preselected even-numbered gear is the fifth specified gear, control flow goes to step S318. If the result of determination is "No", namely it is determined that the to-be-preselected even-numbered gear is not the fifth specified gear, the routine is quitted.

At step S318, it is determined whether the actual even-numbered gear is the fifth specified gear (second gear in the present example). Specifically, whether a preshift to an even-numbered gear has been accomplished so that the fifth specified gear is actually selected is determined. If the result of determination is "Yes", namely it is determined that the actual even-numbered gear is the fifth specified gear, control flow goes to step S320. If the result of determination is "No", namely it is determined that the actual even-numbered gear is not the fifth specified gear, the routine is quitted.

At step S320, uphill deceleration forced low-gear traveling is started. Specifically, the motor 25 is actuated to produce power to make the drive wheels rotate on power from the motor 25. Then, the routine is ended.

Suppose that uphill deceleration forced low-gear traveling control is performed when the vehicle traveling in sixth gear (with fifth gear preselected) is decelerated on an uphill slope, wherein the to-be-selected traveling gear is first gear (second gear setting; the to-be-preselected gear is second gear), and the start gear, determined depending on road surface inclination and vehicle weight including cargo weight, is first gear. Under the uphill deceleration forced gear rest control, when it is determined that the to-be-selected traveling gear is not neutral (N) and the to-be-selected traveling gear is a gear other than the actual even-number gear (namely, the actual odd-numbered gear) and the to-be-selected even-numbered gear is the fifth specified gear (second gear, for example), only the third synchronizer mechanism 56 (first switch unit) is activated to cause second gear (first gear setting) to become selected. Then, when it is determined that the actual even-number gear is the fifth specified gear (second gear in the present example), the motor 25 is actuated to produce power to make the drive wheels rotate on power from the motor 25. Then, under the uphill deceleration forced gear reset control, the second synchronizer mechanism 54 is activated to cause the to-be-selected traveling gear, namely first gear (second gear setting) to become selected.

As seen from the above, when the vehicle is decelerated and then re-accelerated on an uphill slope, for example, the gear-shift control apparatus for the vehicle according to the present invention determines, in the uphill deceleration determination procedure, that the vehicle is being decelerated on an uphill slope. When determining that the vehicle is being decelerated on an uphill slope in the uphill deceleration determination procedure, if the gear suited for re-acceleration, namely to-be-selected gear is lower than or equal to the second specified gear (second gear, for example) and the actual even-numbered gear is higher than or equal to the fourth specified gear (fourth gear, for example) and the actual odd-numbered gear is the fourth specified gear (fifth gear, for example) or higher, the gear-shift control apparatus starts uphill deceleration forced gear resetting. Specifically, the gear-shift control apparatus first activates the first, second and third synchronized mechanisms 55, 54, 56 to take neutral (N) position to create a state in which no gear is selected, and then, activate the first, second and third synchronized mechanisms 55, 54, 56 to take positions causing a gear suited for re-acceleration, or to-be-selected traveling gear to become selected. Under the uphill deceleration forced gear reset control, if it is determined that the to-be-selected gear is not neutral (N) and the to-be-selected gear is a gear other than an actual even-numbered gear (thus, an odd-numbered gear) and the to-be-preselected even-numbered gear is the fifth specified gear (second gear, for example), the gear-shift control apparatus performs uphill deceleration forced low-gear travelling (gear protection control). Specifically, when determining that the actual even-number gear is the fifth-specified gear (second gear, for example), the gear-shift control apparatus actuates the motor 25 to produce power to make the drive wheels rotate on power from the motor 25.

Although the transmission 30 is intended to conduct a step-by-step gear shift for structural reasons, when the vehicle is decelerated and then re-accelerated on an uphill slope, a state in which no gear is selected is created, and then a gear suited for re-acceleration is selected. Thus, when the vehicle traveling on an uphill slope in high-speed gear (sixth gear, for example) is decelerated and then reaccelerated and the gear suited for reacceleration (to-be-selected traveling gear) is second gear, for example, a sequential, step-by-step downshift to the to-be-selected traveling gear does not need to be conducted.

This enables a quick shift to the to-be-selected traveling gear, and thus, prevents the vehicle from moving backward when decelerated and then re-accelerated on an uphill slope.

When the transmission 30 is designed such that first gear is selected by activating more than one synchronizer mechanism, specifically the second and the third synchronizer mechanisms 54, 56, and second gear, which is higher than first gear, is selected by activating only the third synchronizer mechanism 56, if, for example first gear is a gear to be selected for re-acceleration, second gear is first selected by activating the third synchronizer mechanism 56, and after second gear is selected, the motor 25 is actuated to produce power to make the drive wheels rotate on power from the motor 25, under the uphill deceleration forced low-gear traveling control (gear protection control). Then, under the uphill deceleration force gear reset control (uphill deceleration gear shift control), a shift to first gear is conducted.

As stated above, after second gear is selected by activating the third synchronizer mechanism 56, the motor 25 is actuated to produce power to make the drive wheels rotate on power from the motor 25. This prevents the vehicle from moving backward before a shift to the to-be-selected gear, or first gear is accomplished.

Further, first shifting to second gear by activating the third synchronizer mechanism 56 and then shifting to first gear by activating the second synchronizer mechanism 54 prevents the second and the third synchronizer mechanisms 54, 56 from being simultaneously subjected to a torque transmitted to the transmission 30 from the tires via the axle, for example, and an inertial torque from the inner clutch and the components constituting first gear, namely the inner input shaft 32, the inner-clutch drive gear 41, the inner-clutch driven gear 42, the outer counter shaft 33 and others, each rotating through inertia.

The second and the third synchronizer mechanisms 54, 56 are thus protected against damage.

In the above, an embodiment of the present invention has been described. The present invention is however not restricted to the described embodiment.

For example, in the described embodiment, at step S320 in uphill deceleration forced low-gear traveling control, the motor 25 is actuated to produce power to make the drive wheels rotate on power from the motor 25. The present invention does not need to be designed this way; it may be designed such that the outer clutch 21 is engaged simultaneously with the motor 25 being actuated to enable the drive wheels to rotate on power from the engine 10. This reliably prevents the vehicle from moving backward, even when power from the motor 25 is insufficient.

Although in the described embodiment, the transmission 30 has first to sixth and reverse gears, the transmission may have a greater or smaller number of gears. In the transmission having a greater number of gears, gear shift time reduction effect, provided by the present invention, is more remarkable.

The described embodiment is intended to be applied to a hybrid vehicle having an engine 10 and a motor 25 as power sources. The present invention is however not restricted to this application, but can be applied to vehicles having an engine 10 as a sole power source. In such application, step S320 in uphill deceleration forced low-gear traveling control is modified such that, instead of the motor 25 being actuated, the outer clutch 21 is engaged to make the drive wheels rotate on power from the engine 10, to prevent the vehicle from moving backward.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

REFERENCE SIGNS LIST

10 Engine (internal combustion engine)
21 Outer clutch (clutch)
22 Inner clutch (clutch)
25 Motor (electric motor)
30 Mechanical automatic transmission
31 Outer input shaft (input shaft)
32 Inner input shaft (input shaft)
33 Outer counter shaft (secondary shaft)
34 Inner counter shaft (secondary shaft)
35 Output shaft
54 Second synchronizer mechanism (switch unit)
55 First synchronizer mechanism (switch unit)
56 Third synchronizer mechanism (switch unit)
46 Brake pressure sensor (traveling state detection unit)
65 Inclination sensor (road surface detection unit)
66 Vehicle load sensor (traveling state detection unit)
80 Vehicle ECU (gear shift control unit)
90 Motor ECU (electric motor control unit)

The invention claimed is:

1. A gear-shift control apparatus for a vehicle, comprising a speed-change unit including two input shafts to which power from an internal combustion engine mounted on the vehicle as a power source is transmitted, each input shaft being provided with a clutch allowing or interrupting power transmission from the internal combustion engine to the input shaft, secondary shafts arranged parallel to the two input shafts, gearwheels arranged on the two input shafts and the secondary shafts to provide more than one gear setting, and more than one switch unit for changing engagement between the gearwheels, the speed-change unit being configured to conduct a shift to an optimal gear setting by up- or downshifting from one gear setting to the next, step by step, by activating the switch units, so that power from the internal combustion engine is supplied from an output shaft at a desired speed-torque ratio;
a gear-shift control unit controlling the clutches associated with the respective input shafts and the switch units;
a road surface detection unit for detecting state of a road surface on which the vehicle is traveling; and
a traveling state detection unit detecting traveling state of the vehicle,
wherein when determining that the vehicle is decelerated and then re-accelerated on an uphill slope, from information from the road surface detection unit and the traveling state detection unit, the gear-shift control unit performs uphill gear-shift control to create a state in which no gear setting is selected and then conduct a shift to a gear setting suited for re-acceleration.

2. The gear-shift control of claim 1, wherein
the gear settings include
a first gear setting which is selected by activating only a first one of the switch units, and
a second gear setting which is adjacent in sequence to the first gear setting and which is selected by activating more than one of the switch units including the first switch unit, and
when determining that the second gear setting is suited for re-acceleration, the gear-shift control unit performs gear protection control to first shift to the first gear setting and then shift to the second gear setting.

3. The gear-shift control apparatus of claim 1, wherein the vehicle is a hybrid vehicle having an electric motor mounted on a first one of the two input shafts as a power source and configured such that power from at least either the internal combustion engine or the electric motor is transmitted via the speed-change unit to the output shaft, and with the gear settings being grouped into a first group of gear settings each established including the first input shaft and thus transmitting power from the electric motor to the output shaft, and a second group of gear settings each established including the other input shaft and not transmitting power from the electric motor, wherein the gear-shift control apparatus further comprises an electric motor control unit controlling operation of the electric motor, and after a shift to a gear setting belonging to the first group is performed, the electric motor control actuates the electric motor to produce torque.

4. A method for a vehicle comprising a speed-change unit including two input shafts to which power from an internal combustion engine mounted on the vehicle as a power source is transmitted, each input shaft being provided with a clutch allowing or interrupting power transmission from the internal combustion engine to the input shaft, secondary shafts arranged parallel to the two input shafts, gearwheels arranged on the two input shafts and the secondary shafts to provide more than one gear setting, and more than one switch unit for changing engagement between the gearwheels, the speed-change unit being configured to conduct a shift to an optimal gear setting by up- or downshifting from one gear setting to the next, step by step, by activating the switch units, so that power from the internal combustion engine is supplied from an output shaft at a desired speed-torque ratio, and a gear-shift control unit controlling the clutches associated with the respective input shafts and the switch units, the method comprising:

detecting, by a road surface detection unit, a state of a road surface on which the vehicle is traveling;

detecting, by a traveling state detection unit, a traveling state of the vehicle, wherein when determining that the vehicle is decelerated and then re-accelerated on an uphill slope, from information from the road surface detection unit and the traveling state detection unit, the gear-shift control unit performs uphill gear-shift control to create a state in which no gear setting is selected and then conduct a shift to a gear setting suited for re-acceleration.

5. The method of claim 4, wherein the gear settings include a first gear setting which is selected by activating only a first one of the switch units, and a second gear setting which is adjacent in sequence to the first gear setting and which is selected by activating more than one of the switch units including the first switch unit, and when determining that the second gear setting is suited for re-acceleration, the gear-shift control unit performs gear protection control to first shift to the first gear setting and then shift to the second gear setting.

6. The method of claim 4, wherein the vehicle is a hybrid vehicle having an electric motor mounted on a first one of the two input shafts as a power source and configured such that power from at least either the internal combustion engine or the electric motor is transmitted via the speed-change unit to the output shaft, and with the gear settings being grouped into a first group of gear settings each established including the first input shaft and thus transmitting power from the electric motor to the output shaft, and a second group of gear settings each established including the other input shaft and not transmitting power from the electric motor, wherein the gear-shift control apparatus further comprises an electric motor control unit controlling operation of the electric motor, and after a shift to a gear setting belonging to the first group is performed, the electric motor control actuates the electric motor to produce torque.

\* \* \* \* \*